US012123380B2

(12) United States Patent
Hughes et al.

(10) Patent No.: US 12,123,380 B2
(45) Date of Patent: Oct. 22, 2024

(54) EGR PUMP LOCKING MECHANISM AND METHOD TO LOCK EGR PUMP ROTATING GROUP DURING ENGINE BRAKING

(71) Applicant: Eaton Intelligent Power Limited, Dublin (IE)

(72) Inventors: Douglas Anthony Hughes, Novi, MI (US); Brandon Dennis Biller, Ferndale, MI (US); Michael Coates, Marshall, MI (US); Nathan DeVille, Marshall, MI (US); James J. Malone, Marshall, MI (US); Jana Malatincova, Roztoky (CZ); Filip Marek, Roztoky (CZ)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/251,837

(22) PCT Filed: Nov. 4, 2021

(86) PCT No.: PCT/EP2021/025432

§ 371 (c)(1),
(2) Date: May 4, 2023

(87) PCT Pub. No.: WO2022/096153

PCT Pub. Date: May 12, 2022

(65) Prior Publication Data

US 2024/0003319 A1 Jan. 4, 2024

Related U.S. Application Data

(60) Provisional application No. 63/109,647, filed on Nov. 4, 2020.

(51) Int. Cl.
*F02M 26/34* (2016.01)
*F02D 41/00* (2006.01)
(Continued)

(52) U.S. Cl.
CPC ......... *F02M 26/34* (2016.02); *F02D 41/0047* (2013.01); *F04C 18/126* (2013.01); *F04C 28/06* (2013.01)

(58) Field of Classification Search
CPC ... F02M 26/34; F02D 41/0047; F04C 18/126; F04C 28/06
See application file for complete search history.

(56) References Cited

U.S. PATENT DOCUMENTS

2021/0277849 A1 * 9/2021 Rahm ..................... F02B 39/04

FOREIGN PATENT DOCUMENTS

JP 2013087687 A 5/2013
WO 2020038577 A1 2/2020

OTHER PUBLICATIONS

International Search Report and Written Opinion for PCT/EP2021/025432, mailed Feb. 11, 2022.

* cited by examiner

*Primary Examiner* — Jacob M Amick
(74) *Attorney, Agent, or Firm* — Merchant & Gould P.C.

(57) ABSTRACT

An EGR pump system includes an EGR pump assembly including an electric motor assembly coupled to a transmission assembly. A roots device is coupled to the electric motor through the transmission assembly. The roots device includes a housing defining an internal volume and rotors are disposed in the internal volume and connected to the transmission assembly. An EGR locking mechanism is attached to the EGR pump assembly. The EGR locking mechanism is selectively connected to the transmission assembly locking the transmission assembly and preventing rotation of the rotors.

19 Claims, 11 Drawing Sheets

(51) Int. Cl.

| | |
|---|---|
| ***F04C 18/12*** | (2006.01) |
| ***F04C 28/06*** | (2006.01) |

EGR PUMP LOCKING MECHANISM AND METHOD TO LOCK EGR PUMP ROTATING GROUP DURING ENGINE BRAKING

CROSS-REFERENCE TO RELATED APPLICATIONS

This application is a National Stage Application of PCT/EP2021/025432, filed Nov. 4, 2021; which claims benefit of U.S. Provisional Patent Application Ser. No. 63/109,647, filed on Nov. 4, 2020, the disclosures of which are incorporated herein by reference in its entirety. To the extent appropriate, a claim of priority is made to each of the above disclosed applications.

FIELD OF THE INVENTION

The invention relates to exhaust gas recirculation (EGR) pumps and control of EGR pumps.

BACKGROUND OF THE INVENTION

During certain engine operating modes, such as exhaust thermal management or engine braking, it is desirable to have zero EGR flow. On a conventional diesel engine this is accomplished by closing the EGR valve. In order to eliminate the EGR valve on an engine utilizing an EGR pump, it would be necessary to control the pump to zero speed in order to stop EGR flow. Generally, an EGR pump's electric motor does not have enough torque to achieve this due to the extremely high pressure ratio across the pump during engine braking. Therefore, there is a need in the art for an EGR pump locking mechanism and a method to keep the EGR pump at zero speed during engine braking.

SUMMARY OF THE INVENTION

In one aspect, there is disclosed an EGR pump system that includes an EGR pump assembly including an electric motor assembly coupled to a transmission assembly. A roots device is coupled to the electric motor through the transmission assembly. The roots device includes a housing defining an internal volume and rotors are disposed in the internal volume and connected to the transmission assembly. An EGR locking mechanism is attached to the EGR pump assembly. The EGR locking mechanism is selectively connected to the transmission assembly locking the transmission assembly and preventing rotation of the rotors.

In another aspect, there is disclosed a method of operating an EGR pump including the steps of: providing an EGR pump assembly including an electric motor coupled to a roots device having rotors, the EGR pump operably connected to an internal combustion engine; providing an EGR locking mechanism attached to the EGR pump assembly; providing an EGR control unit linked to the EGR pump assembly and EGR locking mechanism; providing sensors linked to the EGR control unit; determining if a high pressure ratio management request is received; and locking the EGR pump if high pressure ratio management request or maintaining operation of the EGR pump if a high pressure ratio management request is not received.

DETAILED DESCRIPTION OF THE PREFERRED EMBODIMENTS

Figure 1:
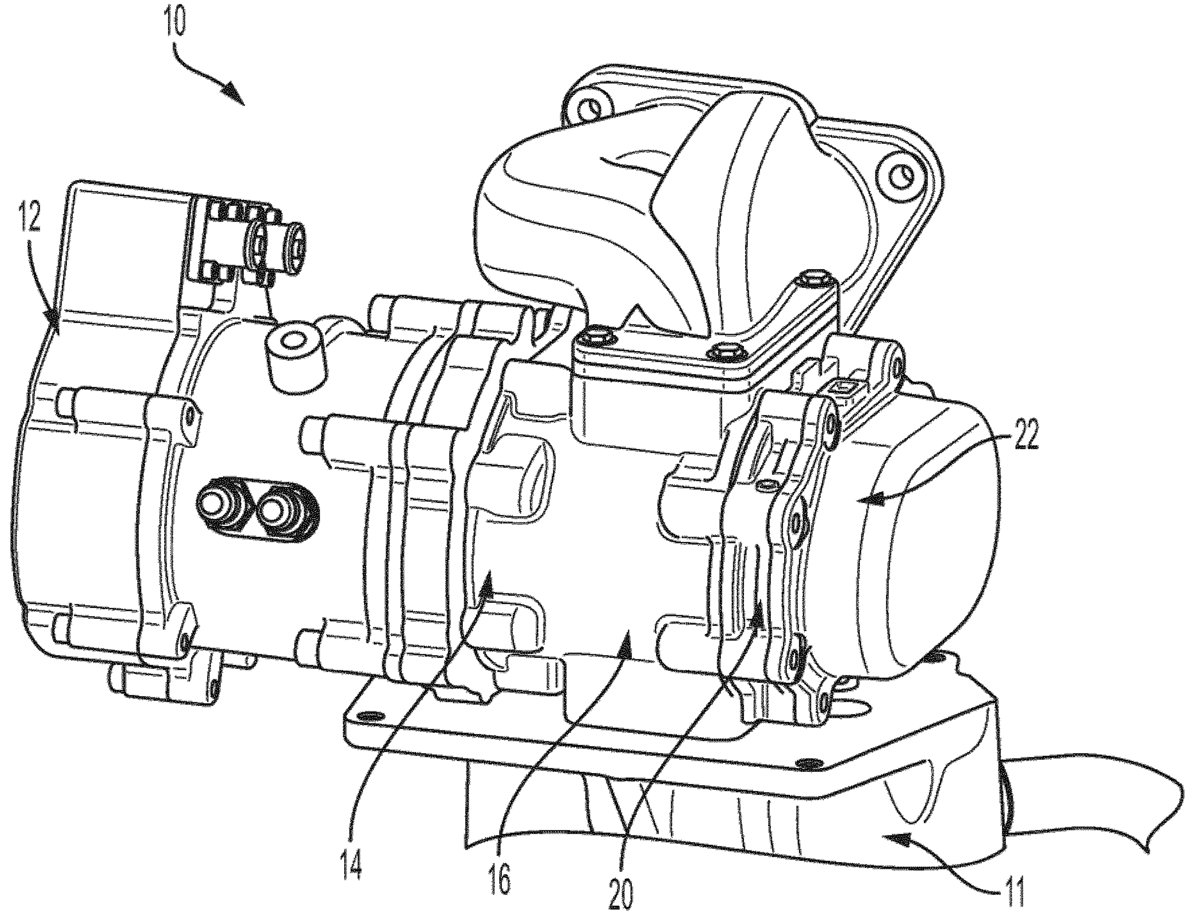
FIG. 1 is a partial perspective view of an EGR pump and engine.

Referring to the figures, there is described an EGR pump locking mechanism and control. The EGR locking mechanism may include an electromechanical solenoid actuator that can push a pin into a slot or hole that is associated with the motor rotor shaft or a disk that is affixed to the shaft. The pin would be spring loaded so that it is normally not engaged to the shaft and allows for normal operation of the motor.

Various engine operating conditions may create a high pressure ratio management event in the EGR pump. Examples include an engine braking event and an exhaust thermal management event. Other operating conditions may also produce a high pressure ratio management event. The pressure ratio is equal to the outlet pressure divided by the inlet pressure. At a pressure ratio of one no torque is applied to the rotors. The electric motor can react torque over a specified operating range such as 0.55<pressure ratio<1.8. A high pressure ratio as defined herein may include pressure ratios of greater than 1.8 or less than 0.55 across the pump. Under such conditions the torque applied to the rotors is large and is above a reaction torque of the electric motor. It is therefore desirable to lock the EGR pump rotors under such operating conditions.

Referring to the Figures, there is shown an exhaust gas recirculation pump (EGR pump) system 10 coupled to an engine 11. The EGR pump system 10 includes an EGR pump assembly 11 that includes an electric motor 12. A roots device 14 is coupled to the electric motor 12. The Roots device 14 includes a housing 16 that defines an internal volume. Rotors 18 are disposed in the internal volume and are connected to the electric motor 12.

The exhaust gas recirculation pump system 10 includes a bearing plate 20 attached to the housing 16. The bearing plate 20 receives bearings. The bearing plate 20 and outer cover 22 define an oil cavity. Oil from an engine enters an oil inlet 24 and into the oil cavity for lubricating and cooling the bearings and rotors 18. The bearings may be open type bearings that are lubricated by the oil. The oil cools and lubricates the rotors 18. The oil exits the oil cavity at an oil outlet 26.

The exhaust gas recirculation pump system 10 includes a transmission assembly 28 that includes a drive gear 30 that is meshed with a driven gear 32. The drive gear 30 is coupled to the rotor 18 which in turn is connected to a shaft of the electric motor 12. The driven gear 32 is meshed with the drive gear 30 and is coupled to the other rotor 18. In one aspect, the transmission assembly 28 is positioned on an opposing side of the housing 16 relative to the electric motor 12.

Figure 2:
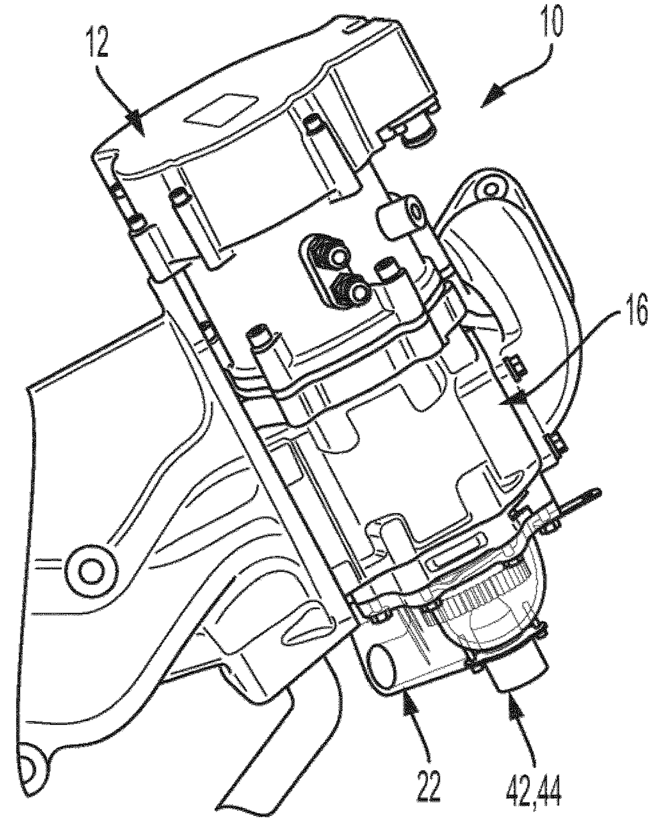
FIG. 2 is a partial perspective view of an EGR pump and engine including a locking mechanism.
Figure 3:
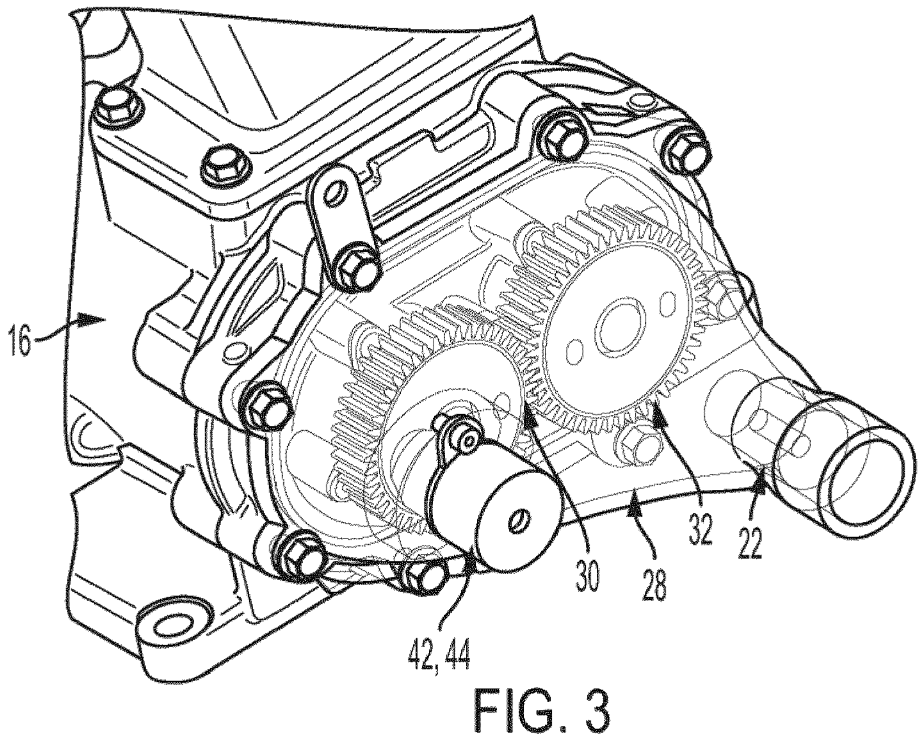
FIG. 3 is a partial perspective view of an EGR pump and engine including a locking mechanism.
Figure 4:
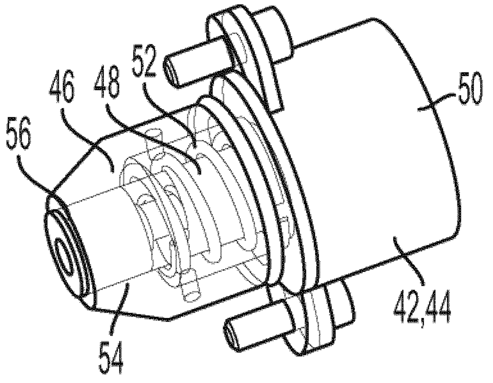
FIG. 4 is a perspective view of a solenoid locking mechanism in a locked position.
Figure 5:
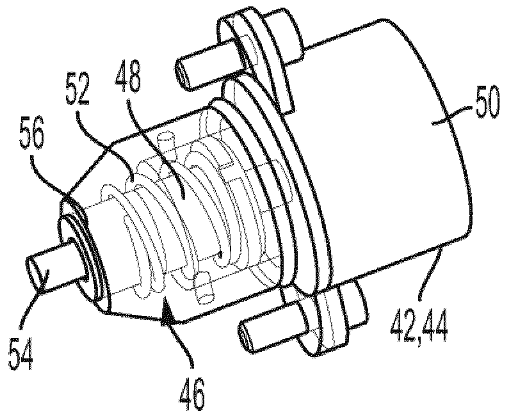
FIG. 5 is a perspective view of a solenoid locking mechanism in an unlocked position.
Figure 6:
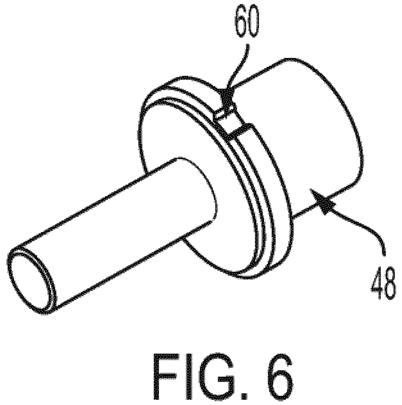
FIG. 6 is a perspective view of a plunger.
Figure 7:
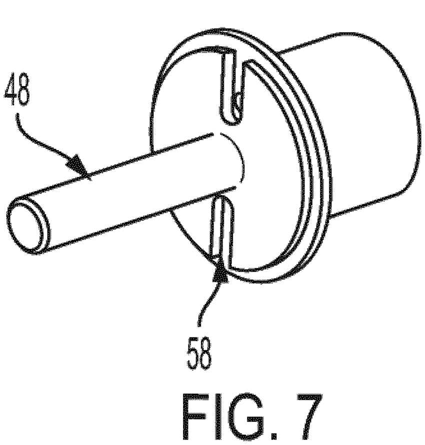
FIG. 7 is a perspective view of a plunger.

Referring to FIG. 2-3, there is shown an exhaust gas recirculation pump (EGR pump) system 10 coupled to an engine 11 and including an EGR pump locking mechanism 42. In one aspect, the EGR pump locking mechanism 42 may be positioned on the cover 22 and pass through the cover 22 to selectively connect with the transmission assembly 28. The EGR locking mechanism 42 may include an electromechanical solenoid actuator 44.

Referring to FIGS. 4-7, the electromechanical solenoid actuator 44 may include a solenoid body 46 that has a plunger 48 positioned therein. A coil 50 is attached to the plunger 48 and moves the plunger 48 in response to an electrical signal energizing the coil 50. A spring 52 may be positioned in the solenoid body 46 to bias the plunger 48 relative to the body 46. The plunger 48 is connected to a locking pin 54 that passes through a slide way structure 56. In one aspect, the plunger 48 may include cutouts 58 or holes 60 formed thereon to allow air flow as the plunger 48 is moving.

Figure 8:
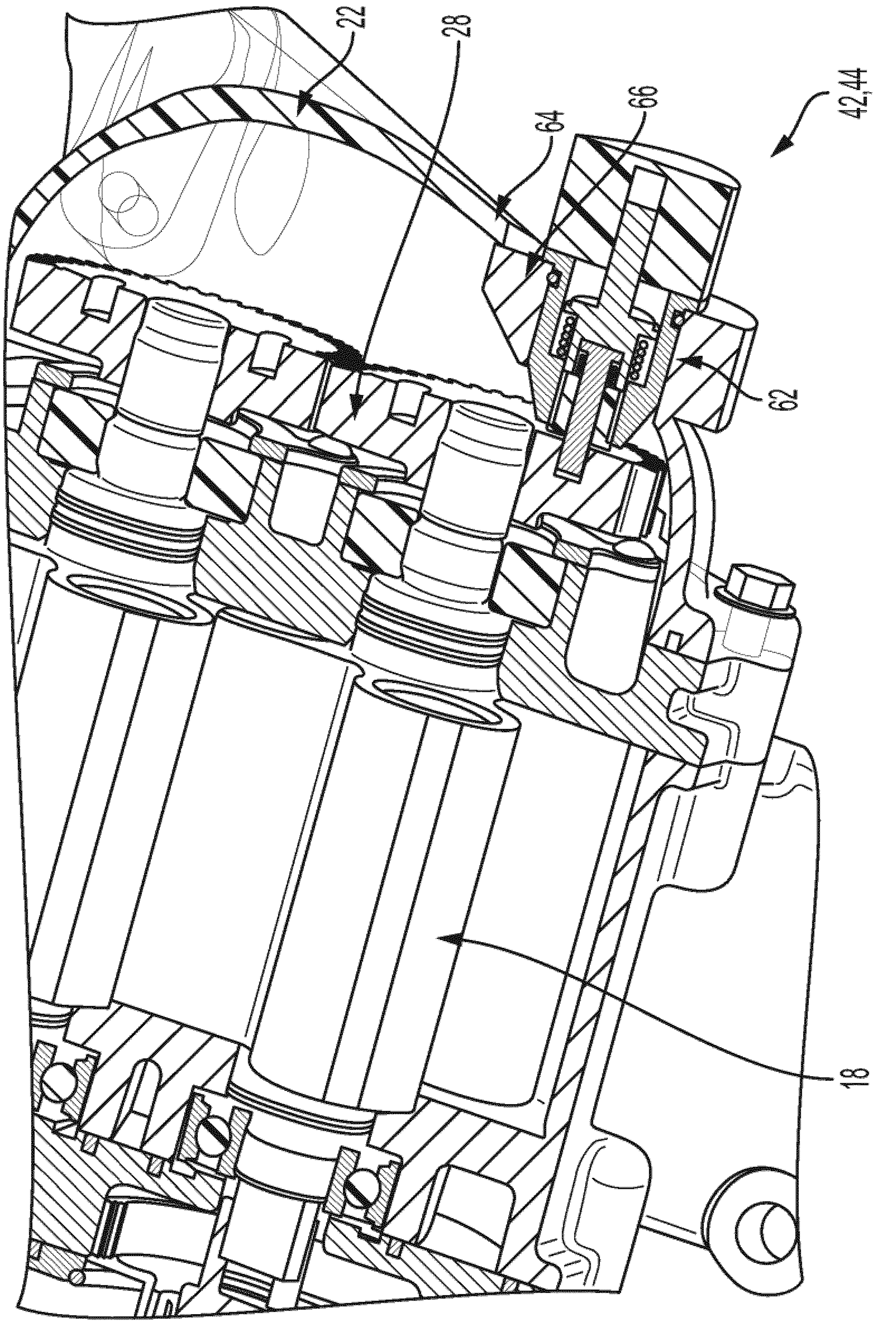
FIG. 8 is a partial sectional view of a first embodiment of an EGR pump and locking mechanism.
Figure 9:
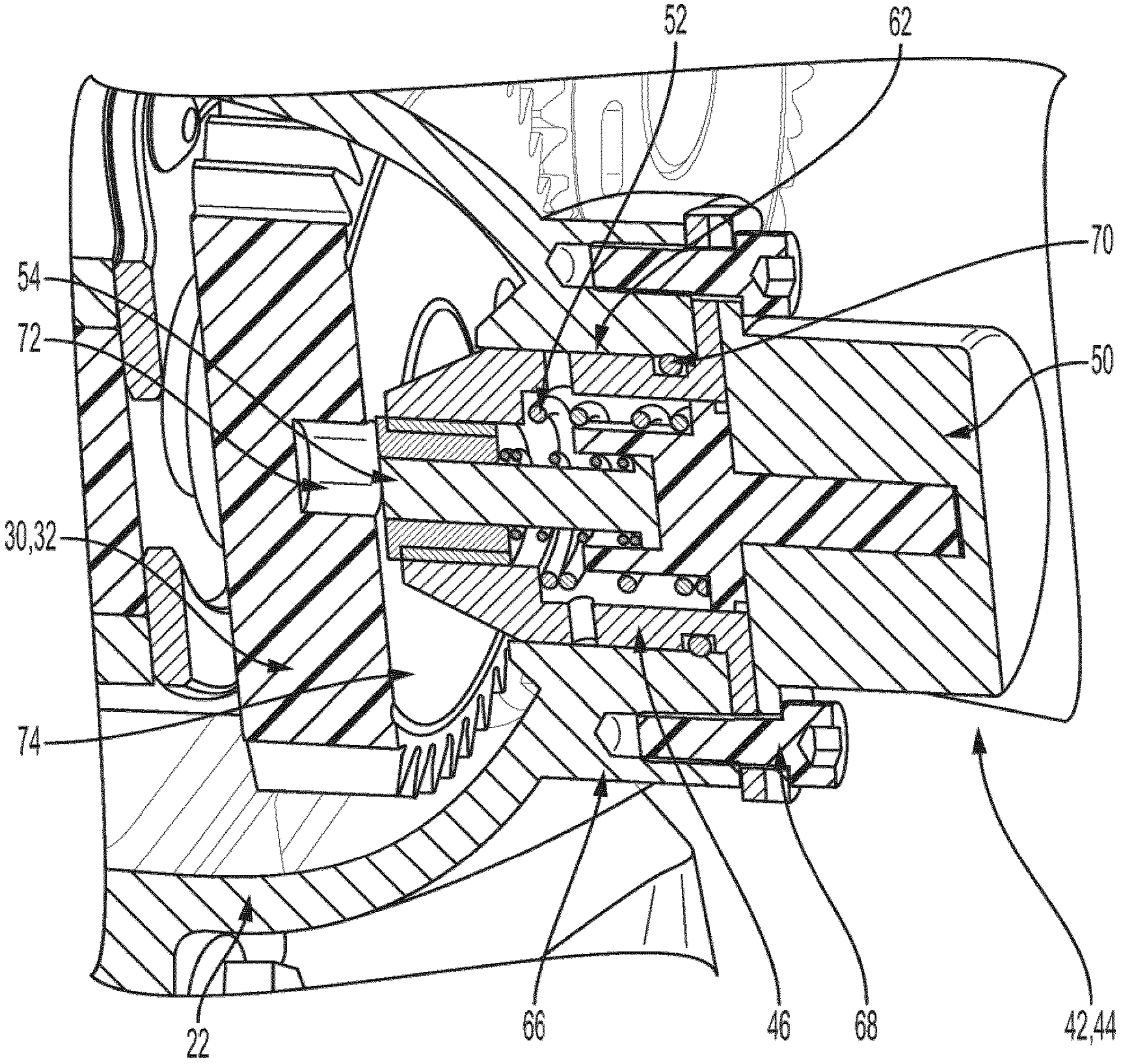
FIG. 9 is a partial sectional view of a first embodiment of an EGR pump and locking mechanism in an unlocked position.
Figure 10:
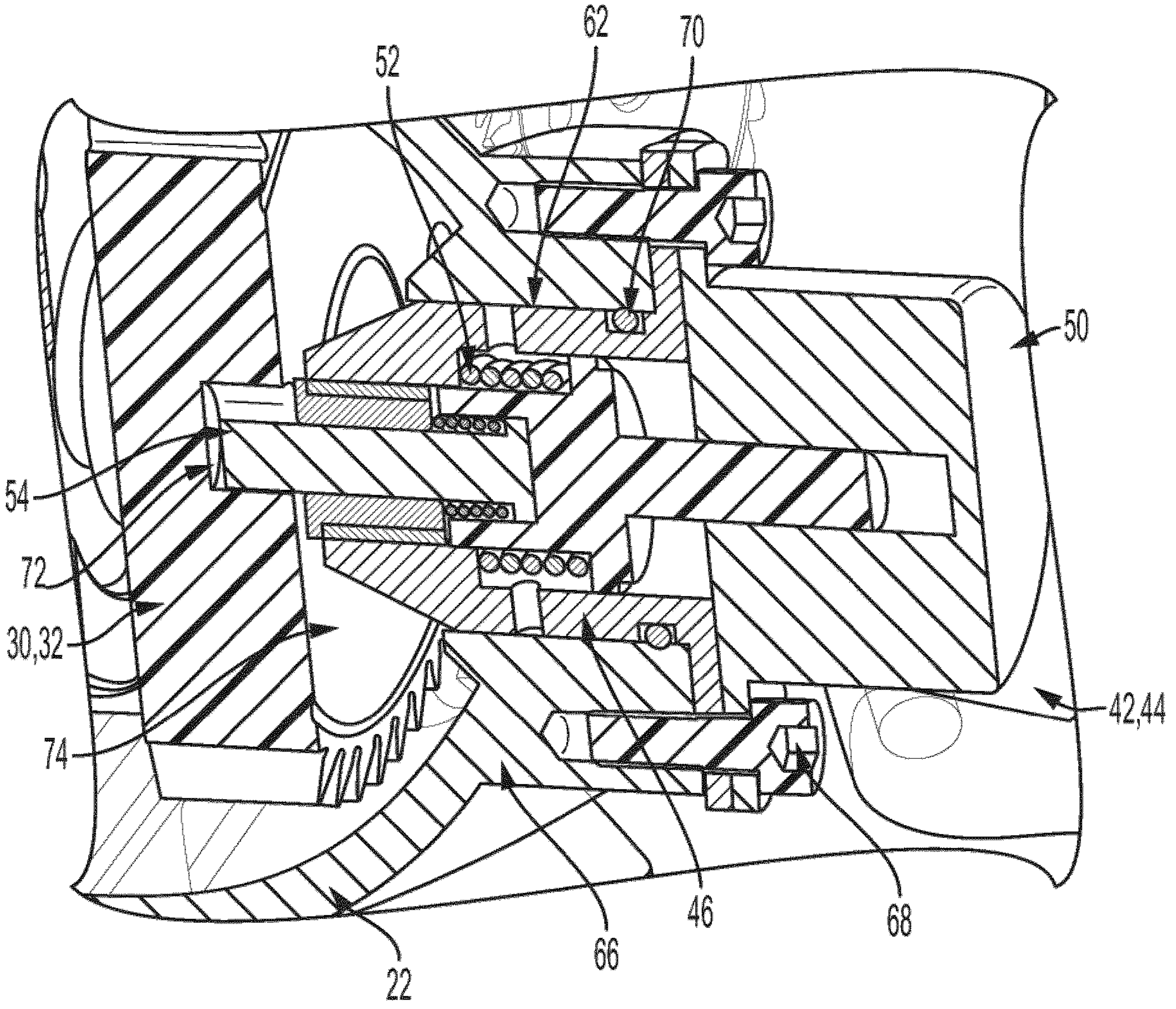
FIG. 10 is a partial sectional view of a first embodiment of an EGR pump and locking mechanism in a locked position.

Referring to FIGS. 8-10, there is shown one embodiment of the EGR pump locking mechanism 42. In the depicted embodiment, the cover 22 includes a passage 62 formed through the end face 64 and includes a flange 66 formed thereon that allows coupling of the locking mechanism 42 to the cover 22 using a fastener 68. The solenoid body 46 passes through the passage 62 and may be sealed to the passage 62 with an O-ring 70. The drive gear 30 and/or driven gear 32 include a plurality of locking slots 72 formed in the end face 74 of the gears. The locking slots 72 are configured to receive the locking pin 54 to lock the EGR pump. In the unlocked position shown in FIG. 9, the spring 52 biases the plunger 48 and locking pin 54 out of engagement with the locking slot 72. In the locked position shown in FIG. 10, the coil 50 is energized and moves the plunger 48 compressing the spring 52 such that the locking pin 54 is positioned in the locking slot 72.

Figure 11:
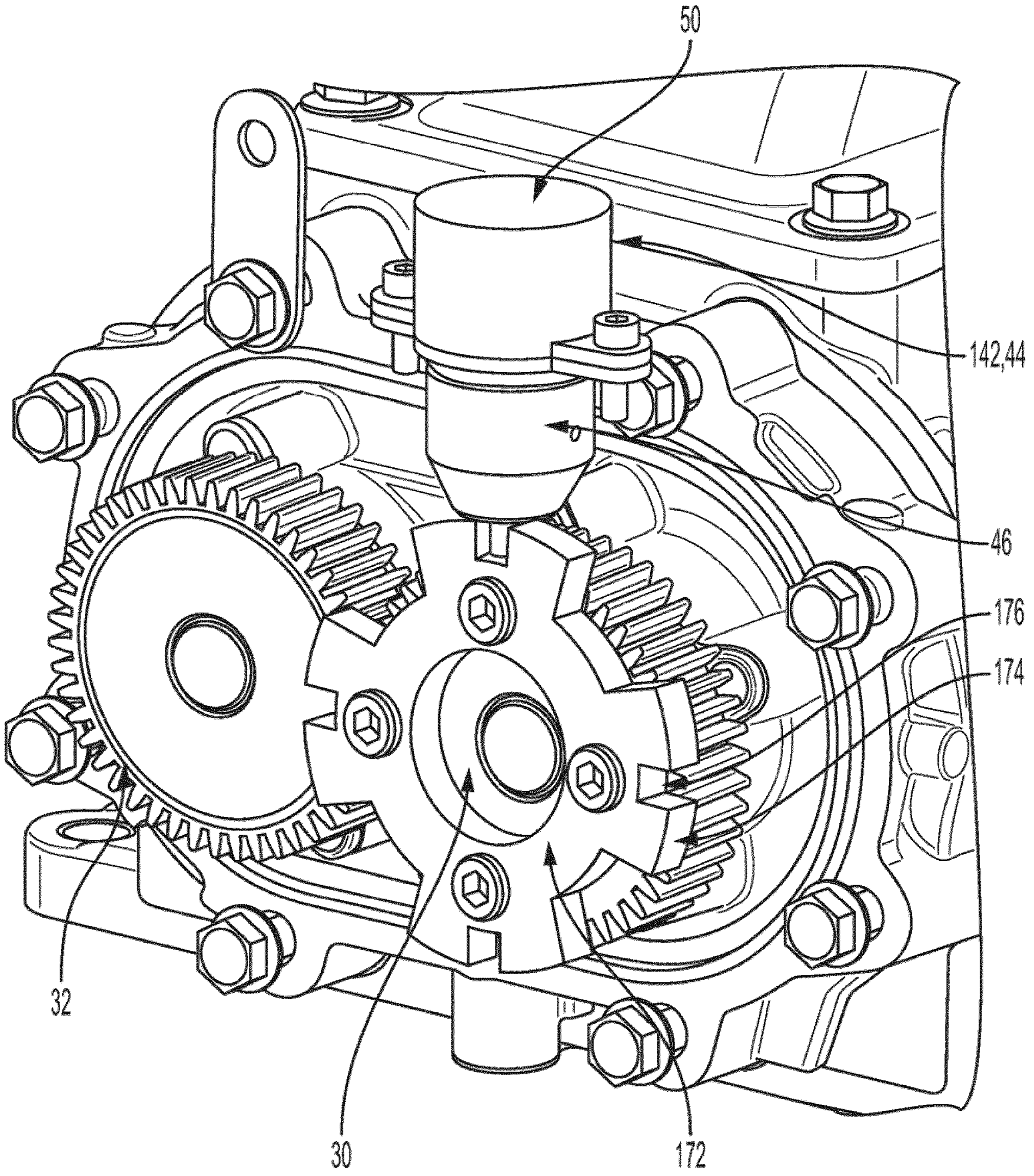
FIG. 11 is a partial sectional view of a second embodiment of an EGR pump and locking mechanism.
Figure 12:
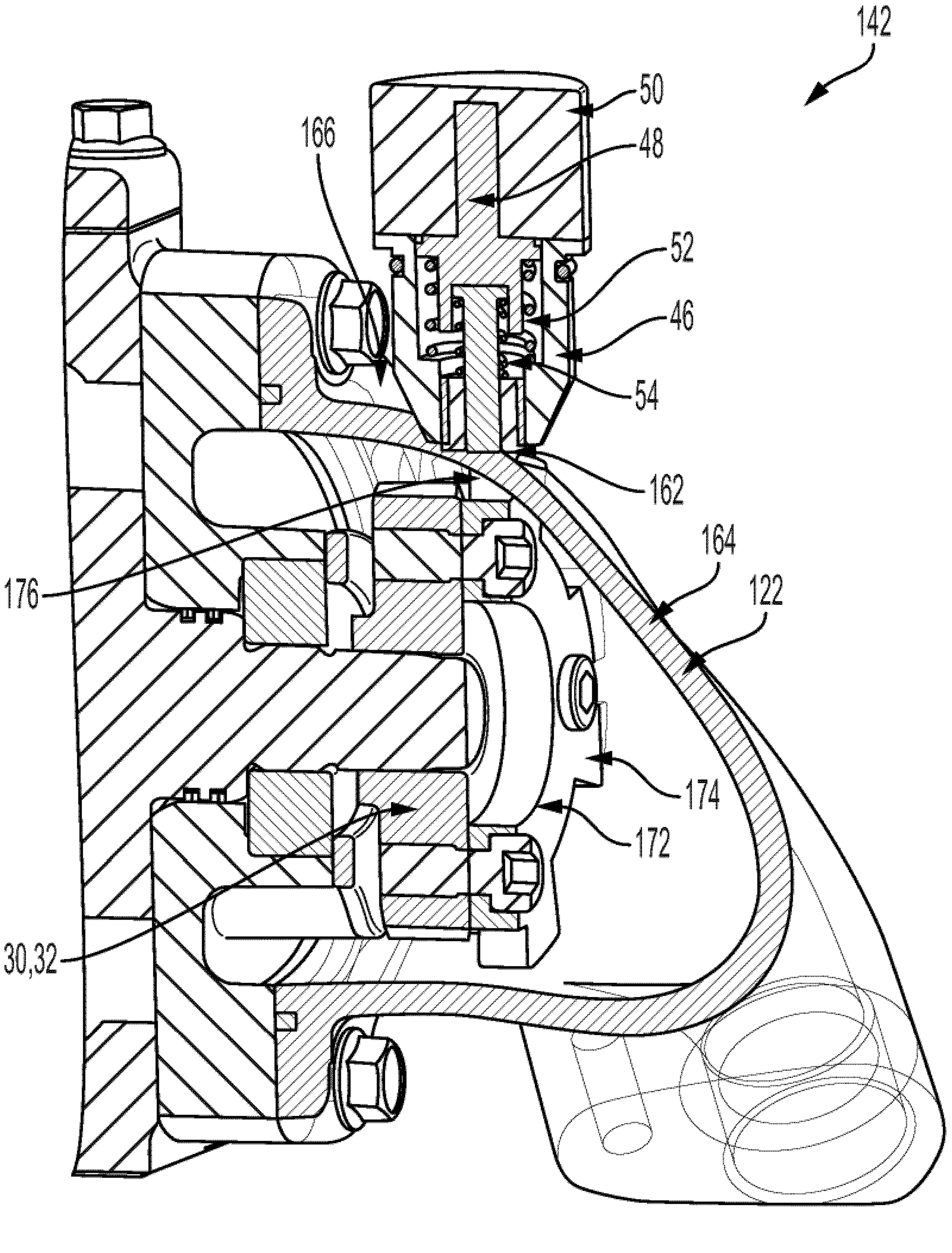
FIG. 12 is a partial sectional view of a second embodiment of an EGR pump and locking mechanism in an unlocked position.
Figure 13:
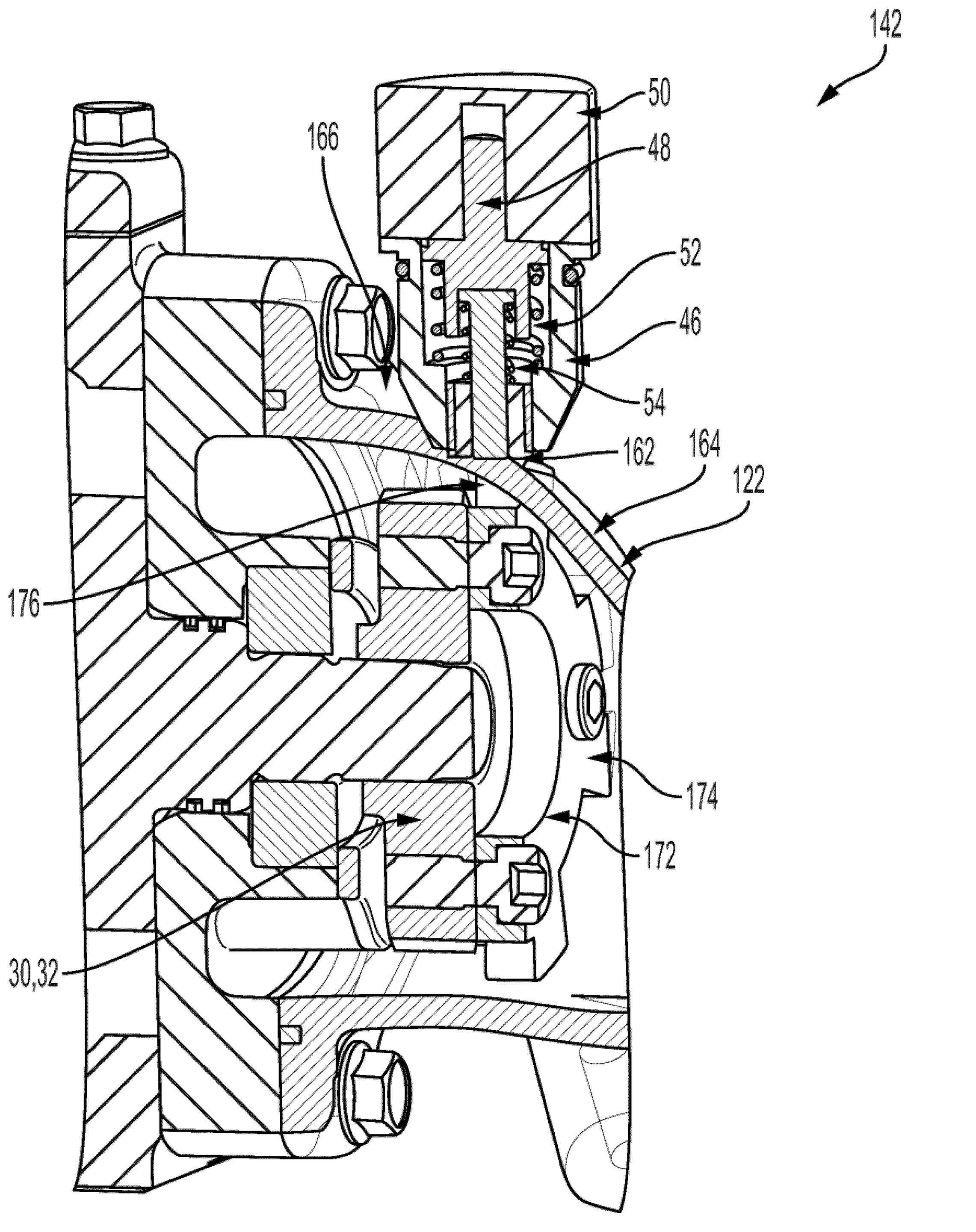
FIG. 13 is a partial sectional view of a second embodiment of an EGR pump and locking mechanism in a locked position.

Referring to FIGS. 11-13 there is shown another embodiment of the EGR pump locking mechanism 142. In the depicted embodiment, the cover 122 includes a passage 162 formed through the side face 164 and includes a flange 166 formed thereon that allows coupling of the locking mechanism 142 to the cover 122. The solenoid body 46 passes through the passage 162. The drive gear 30 and/or driven gear 32 may include a locking plate 172 that is attached or formed with the gears. The locking plate 172 includes a plurality of radially extending teeth 174 formed thereon. A space between adjacent teeth defines the locking slot 176. The locking slots 176 are configured to receive the locking pin 54 to lock the EGR pump. In the unlocked position shown in FIG. 12, the spring 52 biases the plunger 48 and locking pin 54 out of engagement with the locking slot 176. In the locked position shown in FIG. 13, the coil 50 is energized and moves the plunger 48 compressing the spring 52 such that the locking pin 54 is positioned in the locking slot 176.

Figure 14:
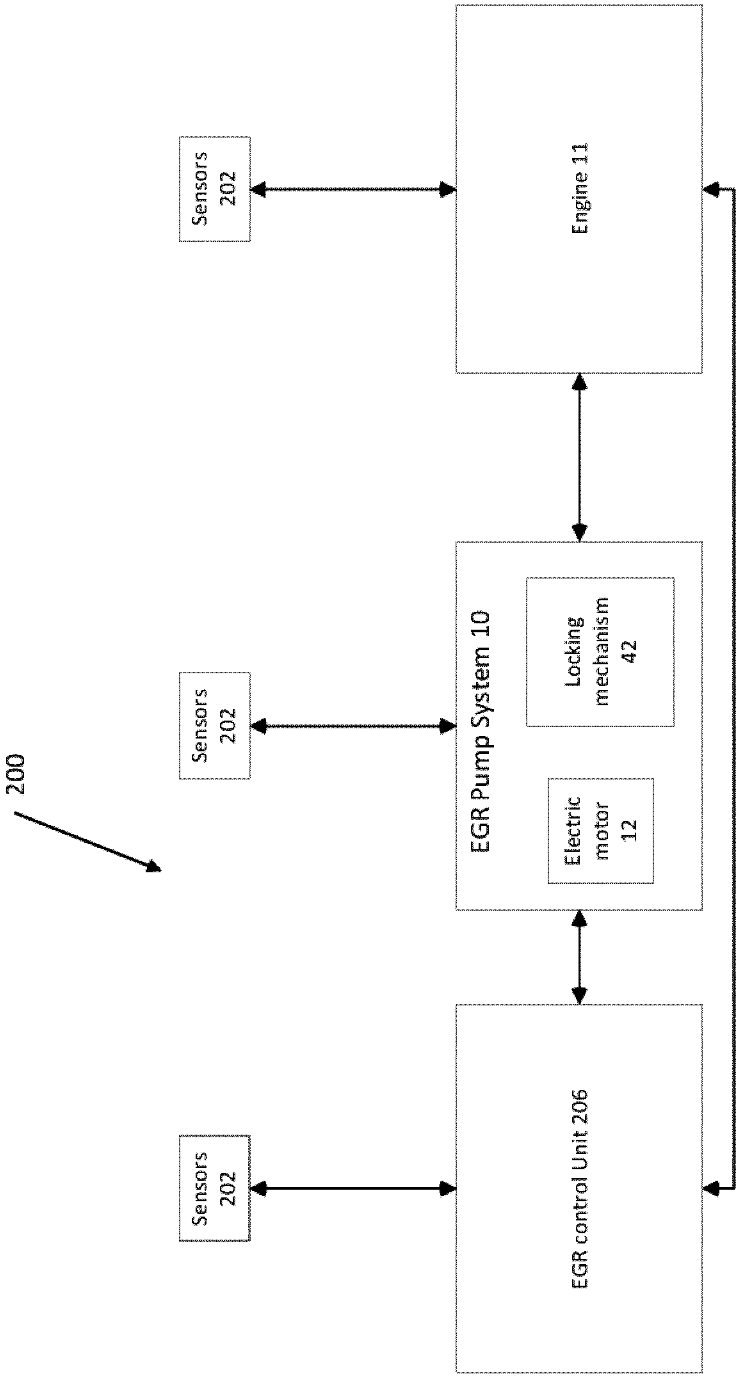
FIG. 14 is a schematic view of a control structure.

Referring to FIG. 14, there is shown a control structure 200 of the EGR pump system. The control structure 200 includes sensors 202 that are in communication with the engine 11, electric motor 12, EGR pump or Roots device 14 and an EGR control unit 206. The control structure 200 includes sensors 202 capable of sensing conditions and of sending signals, such as temperature, pressure, speed, air flow, position, mass flow or volumetric flow. The control structure 200 also includes a control unit 206 which includes a computer processor, communication ports, memory, and programming and is linked with the sensors 202. The control unit 206 may be a portion of an engine control unit (ECU). The arrows indicate communication between the various components of the control structure.

Figure 15:
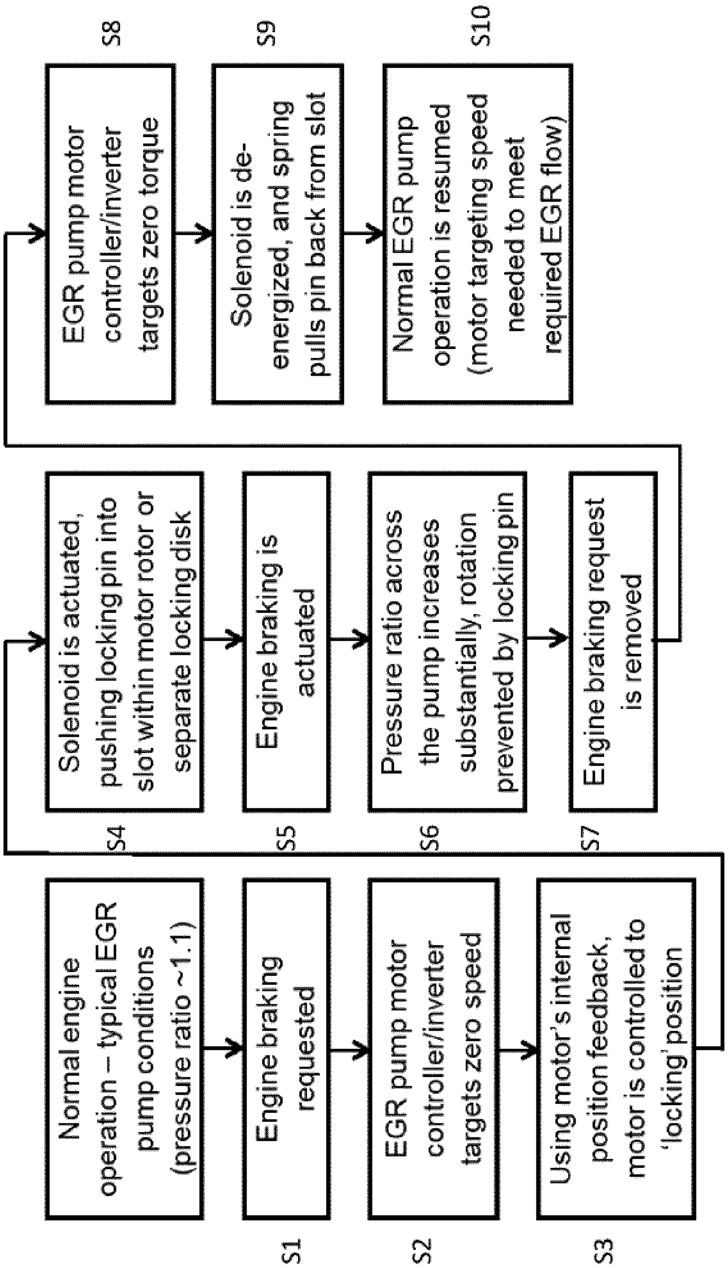
FIG. 15 is a flow diagram of a method of controlling a locking mechanism.

Referring to FIG. 15, there is shown a flow diagram for a method of operating the EGR locking mechanism 42, 142. As indicated above, a high pressure ratio event may require management of the event in the EGR pump using an EGR locking mechanism 42, 142. An example of one such high pressure ratio management event is an engine braking request as shown in FIG. 15. When an engine-braking request is made S1, the motor targets itself to zero speed before the pressure ratio across the pump increases beyond the motor's capability S2. Then using the motor rotor position feedback that an inverter is already measuring using an appropriate sensor the motor can go to a pre-defined position S3 when the locking pin 52 and the locking slot 72, 176 slot line up, and the solenoid 44 can be energized S4.

At this point, the motor control would no longer be active and the locking pin would react all of the torque caused by the high-pressure ratio engine braking conditions S5, S6. When the engine braking operation ends S7, the motor can eliminate the side loading on the pin by targeting zero torque S8, the solenoid can be de-energized and the spring 52 biases the locking pin 54 out of the locking slot 72, 176 S9. The motor can then return to normal speed-target control operation S10.

In one aspect, the electric motor 12 may be loaded against the lock when the lock is engaged. This is so vibration of the rotors does not knock the locking pin 54 back and forth. For example, the electric motor 12 is energized in one direction or another to minimize rotor vibration and the potential for impact between the locking pin 54 and locking slot 72, 176 while the rotor lock is engaged.

The invention claimed is:

1. An exhaust gas recirculation (EGR) pump system comprising:

an EGR pump assembly including an electric motor assembly coupled to a transmission assembly, a roots device coupled to the electric motor assembly through the transmission assembly, the roots device including a housing defining an internal volume and rotors disposed in the internal volume and connected to the transmission assembly; and an EGR locking mechanism attached to the EGR pump assembly, the EGR locking mechanism selectively connected to the transmission assembly, locking the transmission assembly and preventing rotation of the rotors;

wherein the EGR locking mechanism includes an electromechanical solenoid actuator having a movable locking pin that selectively engages the transmission assembly.

2. The EGR pump system of claim 1, wherein the electromechanical solenoid actuator has a solenoid body that has a plunger positioned therein and a coil is attached to the plunger and moves the plunger in response to an electrical signal energizing the coil.

3. The EGR pump system of claim 2 further including a spring positioned in the solenoid body biasing the plunger relative to the body.

4. The EGR pump system of claim 2, wherein the plunger is connected to the locking pin, wherein the locking pin passes through a slideway.

5. The EGR pump system of claim 2 wherein the plunger includes cutouts formed therein allowing air flow as the plunger is moved.

6. An exhaust gas recirculation (EGR) pump system comprising:

an EGR pump assembly including an electric motor assembly coupled to a transmission assembly, a roots device coupled to the electric motor assembly through the transmission assembly, the roots device including a housing defining an internal volume and rotors disposed in the internal volume and connected to the transmission assembly; and an EGR locking mechanism attached to the EGR pump assembly, the EGR locking mechanism selectively connected to the transmission assembly, locking the transmission assembly and preventing rotation of the rotors;

wherein the roots device includes a cover having a passage formed therein, the EGR locking mechanism attached to the cover, the EGR locking mechanism including a solenoid body disposed in the passage and sealed relative to the passage.

7. The EGR pump system of claim 6, wherein the transmission assembly includes a drive gear coupled to a driven gear, either of the gears including a plurality of locking slots formed in an end face of the gear.

8. The EGR pump system of claim 7, wherein the locking slots are configured to receive a locking pin movable by the solenoid body to lock the EGR pump assembly.

9. The EGR pump system of claim 6, wherein the cover includes a flange formed thereon and the EGR locking mechanism is attached to the flange.

10. The EGR pump system of claim 9, wherein the transmission assembly includes a drive gear coupled to a driven gear, either of the gears including a locking plate attached thereon, the locking plate including a plurality of radially extending teeth formed thereon, wherein a space between adjacent teeth defines locking slots.

11. The EGR pump system of claim 10, wherein the locking slots are configured to receive a locking pin movable by the solenoid body to lock the EGR pump.

12. A method of operating an exhaust gas recirculation (EGR) pump for an internal combustion engine comprising the steps of:

providing an EGR pump assembly including an electric motor coupled to a roots device having rotors, the EGR pump operably connected to the internal combustion engine;

providing an EGR locking mechanism attached to the EGR pump assembly;

providing an EGR control unit linked to the EGR pump assembly and EGR locking mechanism;

providing sensors linked to the EGR control unit;

determining if a high pressure ratio management request is received;

locking the EGR pump if the high pressure ratio management request is received or maintaining operation of the EGR pump if the high pressure ratio management request is not received.

13. The method of operating an EGR pump of claim 12, wherein the step of locking the EGR pump includes targeting the electric motor to a zero speed.

14. The method of operating an EGR pump of claim 13, wherein the step of locking the EGR pump includes moving the motor to a predetermined position aligning a locking pin and a locking slot.

15. The method of operating an EGR pump of claim 14, wherein the step of locking the EGR pump includes energizing a solenoid moving the locking pin into the locking slot preventing the EGR pump from rotation.

16. The method of operating an EGR pump of claim 15, further including a step of actuating a high pressure ratio management request.

17. The method of operating an EGR pump of claim 12, further including a step of removing a high pressure ratio management request.

18. The method of operating an EGR pump of claim 17, wherein after removing the high pressure ratio management request, the electric motor is targeted to a zero speed.

19. The method of operating an EGR pump of claim 18, further including a step of de-energizing a solenoid, wherein a spring removes a locking pin from a locking slot, returning the EGR pump to normal operation.

* * * * *